United States Patent [19]

Mumford

[11] 4,268,126
[45] May 19, 1981

[54] THERMAL-PANE WINDOW WITH LIQUID CRYSTAL SHADE

[75] Inventor: Robin B. Mumford, Colts Neck, N.J.

[73] Assignee: Allied Chemical Corporation, Morris Township, N.J.

[21] Appl. No.: 971,298

[22] Filed: Dec. 20, 1978

[51] Int. Cl.³ .............................................. G02F 1/133
[52] U.S. Cl. .................. 350/331 R; 52/171; 52/789
[58] Field of Search ...................... 350/331 R; 428/34; 52/171, 172, 202, 307, 308, 397, 398, 788, 789

[56] References Cited

U.S. PATENT DOCUMENTS

| | | | |
|---|---|---|---|
| 3,981,294 | 9/1976 | Deminet et al. | 52/788 X |
| 3,986,022 | 10/1976 | Hyatt | 350/331 R X |
| 4,173,668 | 11/1979 | Hentzelt et al. | 52/171 X |

OTHER PUBLICATIONS

Sprow: "Liquid-Crystal Displays Brighten", *Machine Design*, Sep. 7, 1972, pp. 112–117.

*Primary Examiner*—Edward S. Bauer
*Attorney, Agent, or Firm*—Ernest D. Buff; Frank A. Peacock; Gerhard H. Fuchs

[57] ABSTRACT

A thermal-pane window unit having an electro-optical shade of adjustable transmittance is provided for reducing radiative heat transfer, as well as conductive transfer, between the exterior and interior of a building and, additionally, for presenting an attractive shaded window appearance. The invention utilizes a liquid crystal cell of selectable light transmittance in combination with a conventional dual pane heat insulating window. The liquid crystal material is preferably electro-optically responsive to a low voltage AC field.

5 Claims, 2 Drawing Figures

THERMAL-PANE WINDOW WITH LIQUID CRYSTAL SHADE

BACKGROUND OF THE INVENTION

This invention relates generally to the use of a liquid crystal material to selectively control light transmission through a transparent panel. Specifically, this invention relates to the use of a liquid crystal material to provide a window shade of selected transmittance, in combination with a dual pane heat insulating window panel (thermal-pane window).

Thermal-pane windows conventionally make use of spaced dual panes to provide a thermal barrier restricting heat conduction between the outside and the inside of a building and therefore tending to reduce heating and cooling costs. To further reduce cooling costs, window shades or blinds are used to block out intense, direct rays of sunlight, since conventional windows, insulating or otherwise, have little effect on radiative heat transfer. However, in using a conventional shade to eliminate sun glare, the view to the outside is blocked, which may be considered a visually unattractive result. The present invention overcomes this limitation without sacrificing energy efficiency by providing an electro-optical shade as an integral part of a thermal pane window. The room occupant may select the degree of light transmittance of the shade, thus eliminating glare and the adverse effect on cooling requirements from direct rays of the sun, while not blocking the view to the outside.

The present invention makes use of liquid crystal material to selectively control the intensity of light transmission through a window. Generally, use of liquid crystal materials to selectively control light transmission through a transparent panel is known. Representative patents disclosing the nature of liquid crystal materials and their use are U.S. Pat. No. 3,322,485 "Electro-optical Elements Utilizing an Organic Nematic Compound" issued Apr. 30, 1967, to R. Williams and U.S. Pat. No. 4,005,928 "Nematic Liquid Crystal Displays for Low Voltage Direct Current Operation" issued Feb. 1, 1977, to A. Kmetz.

The term "electro-optical liquid crystal cell" as used hereinafter is intended to mean a volume of liquid crystal material between two closely spaced electrodes, the liquid crystal material being electro-optically responsive to an electric field between the energized electrodes, such that light transmittance through the liquid crystal material is selectable depending upon the field strength. Further details are given below.

SUMMARY OF THE INVENTION

The present invention provides an electro-optical shade of adjustable light transmittance as an integral part of a thermal-pane window unit. Thus, the window unit is resistant to radiative and conductive heat transfer between the exterior and interior of a building. The window unit comprises three parallel, spaced window panes, mounted in a window frame, delimiting therebetween a first space providing a thermal break and a second space containing an electro-optical liquid crystal cell providing a selected light transmittance.

The window unit may further comprise frame means for securing the mutual orientation of a plurality of transparent, parallel, sequentially spaced panes for sealingly isolating the spaces therebetween; a first transparent pane mounted in the window frame in the outermost position toward the exterior facing side of the frame; a second transparent pane, parallel to and spaced from the first pane, mounted in the frame in a position intermediate between the exterior facing and interior facing sides of the frame, the opposing faces of the first and second panes delimiting a first space for a thermal conduction break; a third transparent pane, parallel to and spaced from the second pane, mounted in the frame in the innermost position toward the interior facing side of the frame, the opposing faces of the second and third panes delimiting a second space for containing an electro-optically responsive material; a liquid crystal material in the second space between the opposing faces of the second and third panes; transparent, electrically conductive film on each of the opposing faces of the second and third panes; and electrical means for applying an electric field between the conductive films and through the liquid crystal material of a selected field strength at least sufficient to exceed the threshold required to cause light scattering in the liquid crystal material.

The liquid crystal material may be selected as one being electro-optically responsive over a substantially full range of transmittance to a low voltage AC or DC field to minimize the risk of shock hazard in the event of breakage or electrical malfunction.

The panes may be light polarizing to further reduce glare from direct sunlight.

The first space between the opposing faces of the first and second panes may be evacuated to the extent practical to enhance the thermal conductivity break characteristics.

BRIEF DESCRIPTION OF THE DRAWINGS

Further details are given below with reference to the embodiment shown in the drawing in which.

DESCRIPTION OF THE PREFERRED EMBODIMENTS

Figure 1:
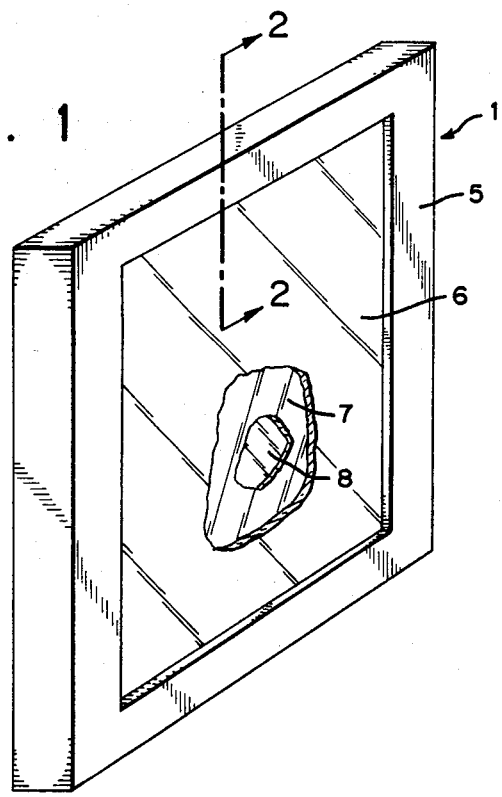
FIG. 1 is a perspective view of a multi-paned window of the present invention in a typical frame.
Figure 2:
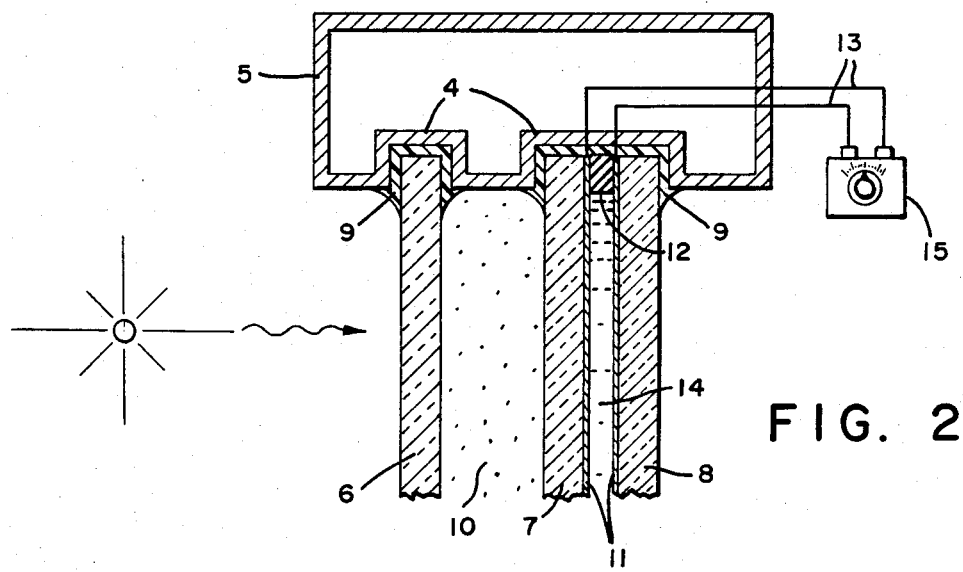
FIG. 2 is a cross-sectional view taken along line 2—2 of FIG. 1, showing a thermal barrier space between the outer pane and the middle pane and a liquid crystal cell between the middle pane and the inside pane.

Referring specifically to the drawings, in FIG. 1 a window unit 1 is shown having three parallel, spaced transparent panes 6, 7, and 8 mounted in a conventional frame 5. A cross-sectional view is taken along the line 2—2 in the direction indicated by arrows and is shown in FIG. 2.

Transparent panes 6, 7, and 8 are mounted in channels 4 of frame 5 with a conventional semi-rigid sealant 9, such as butyl rubber, so that the panes are parallel and spaced, respectively. The sealant aids in securing the mutual orientation of the panes and seals or isolates the spaces between the panes. The window unit is mounted in a window opening of a wall structure so that pane 6 is the outside pane and pane 8 is the inside pane. Panes 6 and 7 and the space 10 therebetween constitute the thermal-pane portion of the embodiment which operates in conventional fashion, i.e. space 10 provides a thermal barrier significantly restricting the conduction of heat through the window. Frame 5 is shown as being hollow, by way of example, to restrict peripheral heat conduction and may be an extruded aluminum alloy. To enhance the thermal barrier effect, space 10 may be evacuated to the extent practical.

The space between middle pane 7 and inside pane 8 contains a liquid crystal material. The opposing faces of panes 7 and 8 have a transparent, electrically conducting film, such as tin oxide, as is known in the art, constituting electrodes 11. Electrical leads 13 are connected to electrodes 11 from a variable voltage supply 15. A shim 12 is provided to adjust the close spacing, typically about 1 mil or so, between the panes delimiting the liquid crystal cell. As is shown in the above-cited patents, electrode separation distance is known to be critical to the successful operation of a liquid crystal cell.

The nature of liquid crystal materials may be summarized as follows: The three common states of matter are the solid, liquid, and gas states in which the randomness of geometrical arrangement of the molecules increases from the solid to the liquid to the gas. The gas and the ordinary liquid are both isotropic, having the same physical properties in all directions. Most solids are found to be crystalline; that is, their molecular units are arranged in a regular repeating geometrical pattern of lattice units and consequently are frequently anisotropic in that their physical properties vary depending upon the direction of measurement with respect to different crystal axes. Certain organic solid compounds exhibit a peculiar behavior such that upon melting a turbid melt results that changes abruptly to clear isotropic liquid upon heating to a higher temperature. In this temperature range, these compounds are anisotropic with respect to transmission of light. Thus, the characteristics of these compounds are partly those of the isotropic liquid since they exhibit liquid flow and partly those of the anisotropic solid. Therefore, these materials are often called "liquid crystals" or, more accurately, "crystalline liquids" and are sometimes classified as a fourth state of matter referred to as the mesomorphic state or mesophase, being a state or phase intermediate that of the anisotropic crystal and that of the isotropic liquid. There are essentially two major classes of liquid crystals, the "nematic" state and the "smectic" state. The nematic liquid crystal materials generally consist of rod-shaped molecules that tend to align parallel to a common direction resulting in anisotropy for many of the bulk properties. When the alignement is uniform, the sample is optically clear. However, when an electrical current is passed through a thin nematic layer, the uniform alignment is disrupted causing scattering or refraction of incident light, termed dynamic scattering. The smectic state is a more highly ordered state than the nematic state. Materials of this type do not exhibit many of the useful optical properties characteristic of the nematic state. Specifically, they do not exhibit dynamic scattering in response to an electric field. On the other hand, smectic materials are desirable in that they exhibit a very low crystal to mesomorphic transition temperature and often exist in a mesomorphic state at room temperatures. However, mixtures of smectic and nematic materials may be produced which are effective to produce dynamic scattering at room temperatures.

Generally, the operation of a liquid crystal cell to selectively control the intensity of transmitted light through the cell may be illustrated as follows: An observer views the liquid crystal cell in a direction normal to the two transparent electrodes. A light source is positioned to direct a collimated beam of light rays onto the side of the device opposite the observer so that the incident light rays pass through the device normal to the transparent plates and the transparent electrodes and the layer of liquid crystal material. When the electric field between the two electrodes is zero, the light rays transmitted through the device are in the same direction as the incident light rays. The observer therefore sees the cell as uniformly bright. When the electric field between the two electrodes is increased, no effect is observed until a certain threshold value is reached. This threshold value for the applied field is typically about 2 to 20 volts per mil. When this threshold value for the applied field is reached, there is a sudden change in the optical properties of the cell. This change in the optical properties of the liquid crystal material is manifested as a scattering of transmitted light in all directions. The observer now suddenly sees the area as darker. Transmittance decreases to a minimum as the field is increased.

The voltage supply to the electrodes of the present invention is preferably taken from ordinary AC household supply for purposes of simplicity. Further, it is preferred to reduce the voltage by a transformer to a voltage less than about 15 to 20 volts to minimize the risk of shock hazard to the user in the event of breakage or malfunction. A fuse may be inserted on the secondary side of the transformer as an additional safety feature. The transformer is adjustable from zero volts up to the voltage threshold for dynamic light scattering in the particular liquid crystal material and further up to the voltage where minimum transmittance is achieved, preferably less than roughly 20 volts. Alternatively, if the particular liquid crystal material is responsive to a low voltage DC supply, then the control unit may be battery powered.

Various liquid crystal materials are commercially available, and therefore it is not the intent to limit the present invention to the use of any particular one so long as certain general requirements are met. The liquid crystal material should have an operating temperature range at least coextensive with the range of temperature usually experienced in a habitable building allowing for temperature extremes near windows. The liquid crystal material should be colorless for purposes of appearance of the window unit. The liquid crystal material should be responsive to a low voltage AC power supply, consistent with the field strength requirement as discussed above. For illustrative purposes only, examples of liquid crystal materials generally meeting these requirements are shown in the above cited U.S. patents and are hereby incorporated by reference. Further examples are shown in U.S. Pat. Nos. 3,829,491 issued Aug. 13, 1974 and 3,809,656 issued May 7, 1974 to E. Strebel, hereby incorporated by reference, wherein one such representative nematic material is N-(p-methoxybenzylidene)-p-n-butyl aniline.

In use, the window unit 1 may be mounted in hinged and thermally sealed fashion over the inside of an existing window. The window unit 1 is placed so that the thermal barrier (pane 6) is towards the outside and the shade (pane 8) is towards the inside. Alternatively, or for new construction, the window unit 1 may be used alone without a conventional window. Thus, the user is afforded in one unit a storm window and an electro-optical shade having variable light transmittance, selectable at the user's option.

Further features of convenience may be added. For automatic operation, an optical sensor may be included in the circuitry so that the opacity of the shade is controlled automatically according to the intensity of light impinging on the outside of the window. To facilitate maintenance, access conduits and valves may be provided for spaces 10 and 11 for purge and/or refill. To reduce glare particularly when the unit is operated to the full transmittance mode and to reduce opacifying requirements of the liquid crystal cell, panes 6, 7, and/or 8 may be light polarizing. To further reduce peripheral heat conductance through the frame 5, a thermal break material may be included as an integral component of the frame.

While preferred embodiments of the invention have been illustrated and described, it will be recognized that the invention may be otherwise variously embodied and practiced within the scope of the following claims:

What is claimed is:

1. A thermal-pane window unit resistant to radiative heat transfer as well as conductive heat transfer, comprising:
   three parallel, spaced window panes, mounted in a window frame, delimiting therebetween a first space providing a thermal break and a second space containing an electro-optical liquid crystal cell providing a selected light transmittance.

2. A thermal-pane window unit with an electro-optical shade for use in a window space of a building structure, comprising:
   (a) window frame means for securing the mutual orientation of a plurality of transparent, parallel, sequentially spaced panes and for sealingly isolating the spaces therebetween;
   (b) a first transparent pane mounted in said window frame means in the outermost position toward the exterior facing side of said frame means;
   (c) a second transparent pane parallel to and spaced from said first pane, mounted in said frame means in a position intermediate between the exterior facing and the interior facing sides of said frame means, the opposing faces of said first and second panes delimiting a first space for a thermal conduction break;
   (d) a third transparent pane, parallel to and spaced from said second pane, mounted in said frame means in the innermost position toward the interior facing side of said frame means, the opposing faces of said second and third panes delimiting a second space for containing an electro-optically responsive material;
   (e) a liquid crystal material in said second space between the opposing faces of said second and third panes;
   (f) transparent, electrically conductive film on each of the opposing faces of said second and third panes; and
   (g) electrical means for applying an electric field between said conductive films and through said liquid crystal material of a selected field strength at least sufficient to exceed the threshold required to cause light scattering in said liquid crystal material.

3. A window unit, as in claim 1 or 2, wherein said liquid crystal material is electro-optically responsive over a full range of transmittance to a low voltage field.

4. A window unit, as in claim 1 or 2, wherein said panes are light polarizing.

5. A window unit, as in claim 1 or 2, wherein said first space between the opposing faces of said first and second panes is a partial vacuum to enhance thermal break characteristics.

* * * * *